United States Patent [19]

Beyl

[11] Patent Number: 4,762,019
[45] Date of Patent: Aug. 9, 1988

[54] DEVICE FOR FIXING A SHOE ON A PEDAL, A SHOE AND A PEDAL THUS FITTED OUT

[76] Inventor: Jean J. Beyl, 10, Boulevard Victor Hugo, 58000 Nevers, France

[21] Appl. No.: 48,533

[22] Filed: May 5, 1987

Related U.S. Application Data

[63] Continuation of Ser. No. 735,210, May 17, 1985, abandoned.

[30] Foreign Application Priority Data

May 18, 1984 [FR] France ................. 84 07786
Dec. 14, 1984 [FR] France ................. 84 19173

[51] Int. Cl.⁴ .............................................. G05G 1/14
[52] U.S. Cl. ..................................... 74/594.6; 36/131
[58] Field of Search ................. 74/594.6, 594.1, 594.3, 74/602; 36/131; 280/11.31, 212, 214, 215, 261

[56] References Cited

U.S. PATENT DOCUMENTS 590,685  9/1897  Matthews .................... 74/594.6
4,442,732  4/1984  Okajima .................. 74/594.6 X
4,488,453  12/1984  Drugeon ..................... 36/131 X
4,686,867  8/1987  Bernard .................... 74/594.6

FOREIGN PATENT DOCUMENTS 3149345  6/1983  Fed. Rep. of Germany ..... 74/594.6

Primary Examiner—Robert G. Nilson
Attorney, Agent, or Firm—Cushman, Darby & Cushman

[57] ABSTRACT

The fixing device comprises a sole plate fixed to the sole of a cyclist's shoe and comprising forward stop means towards the front and a catch towards the rear. Restraining means mounted on the pedal comprise forward stop means associated with those of the plate, and a holding element movably mounted on the pedal and capable of being applied by elastic biasing means against the rear of said catch. The forward stop means and the catch of the sole plate extend transversely under the sole of the shoe, behind the sole portion having the greatest width, while the associated forward stop means mounted on the pedal extend transversely and are fixed on the pedal behind the pedal spindle.

16 Claims, 7 Drawing Sheets

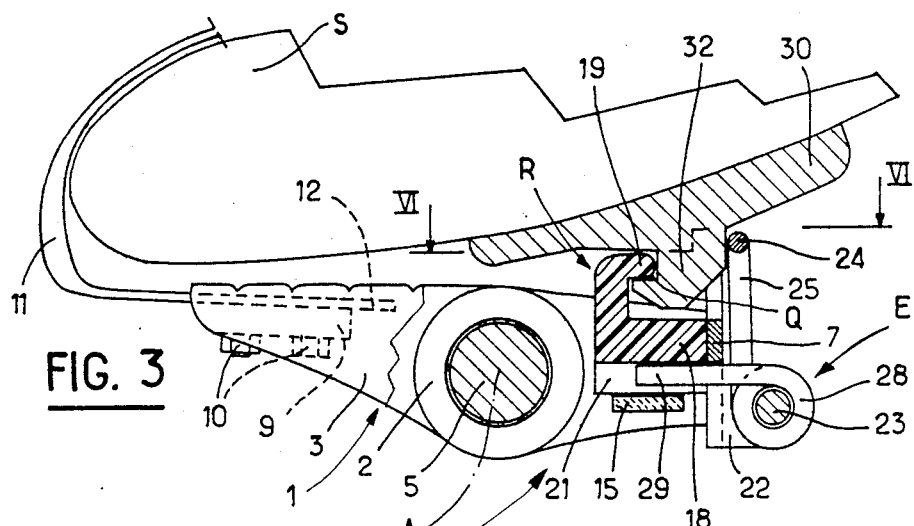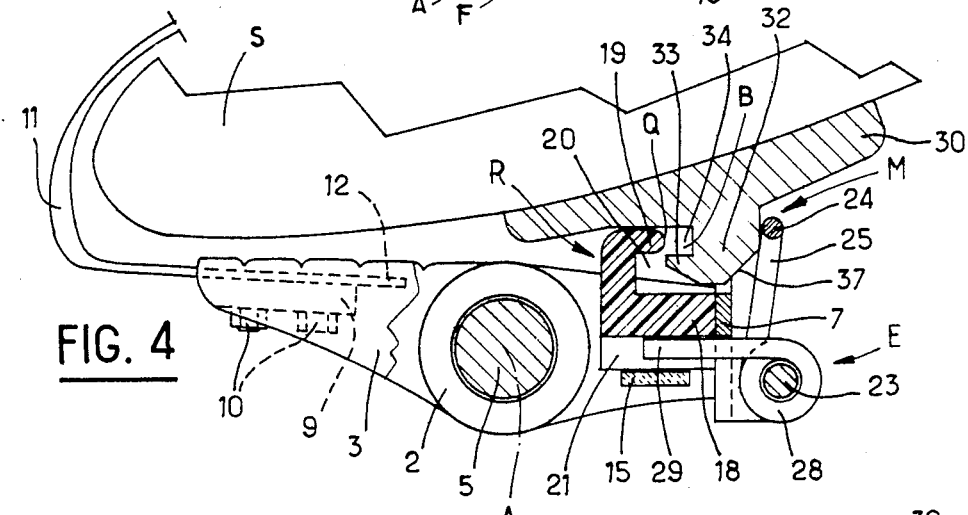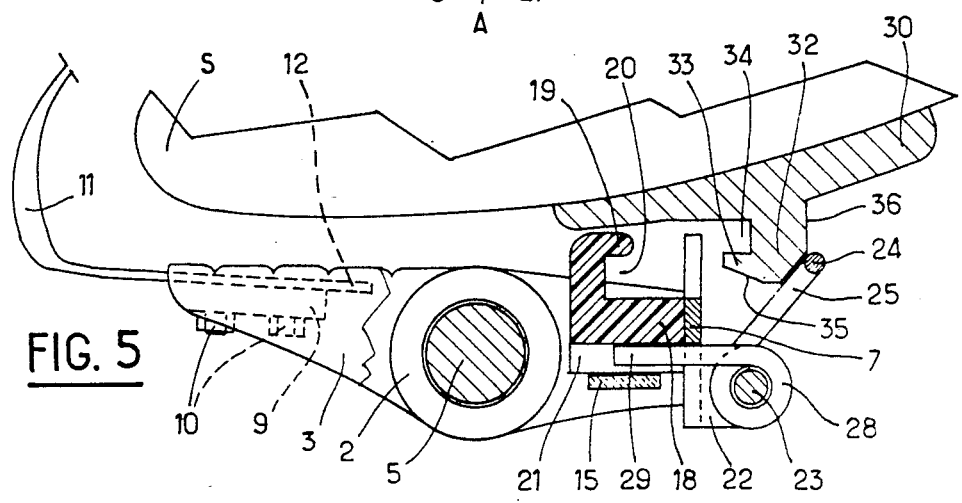

DEVICE FOR FIXING A SHOE ON A PEDAL, A SHOE AND A PEDAL THUS FITTED OUT

This is a continuation of application Ser. No. 735,210 filed May 17, 1985 which was abandoned upon the filing hereof.

FIELD OF THE INVENTION

The invention relates to a device for fixing a shoe on a pedal of a bicycle or a similar machine, the device being of the kind comprising:

a plate fixed to the sole of the shoe and comprising forward frontal stop means and a rearward catch;

restraining means mounted on the pedal, comprising frontal stop means associated with those of the plate for restraining the plate in the forward and upward directions;

and a holding element movably mounted on the pedal and capable of being applied by elastic biasing means against the back of the plate catch, to oppose a rearward displacement of the said plate when the rearward force exerted on the shoe remains below a predetermined threshold, and to allow this displacement when this threshold is reached or exceeded.

PRIOR ART

Devices of this kind are known, in particular from French Published Patent Application No 2 442 175. The release of the foot and of the shoe in relation to the pedal can be obtained by a twisting movement or by a backward movement of this foot in relation to the pedal. The twisting movement is advantageous and, in practice, is used in preference when it is possible.

OBJECTS OF THE INVENTION

It is, however, desirable to improve the conditions wherein this twisting movement is effected.

It is, moreover, desirable to make it possible to combine a fixing device of the kind defined above with the use of a toe strap intended to complete the fixing of the shoe on the pedal.

Now the fixing devices proposed to date do not give complete satisfaction from this point of view since, if they were combined with a toe strap, placed at the rear of the pedal, the user would be practically unable to release his foot by a twisting movement if the strap were relatively tight. In point of fact, the arrangement of these devices is such that a relatively important transverse displacement of the foot occurs during the twisting movement towards the back of the pedal; a tight strap would prevent such a displacement.

Moreover, it is desirable for the fixing device to make it possible not to change the natural position of the foot on the pedal and to leave the foot a certain freedom. A toe clip preventing any mobility, especially angular, of the foot, and in particular a badly placed toe clip, may lead to pain in the region of the knees (tendonitis and, contingently, a lesion of the nerve in the vicinity of the head of the fibula).

The fixing devices already proposed have another drawback in that they require, on the part of the user, a relatively precise transverse positioning of the foot on the pedal in order to engage the fixing device.

The object of the invention is above all to supply a fixing device of the kind defined above which would meet the various practical requirements better than is now the case and which could, in particular, be used in conjunction with a toe strap whilst making it possible to ensure the release of the foot by a twisting movement. It is, moreover, preferentially desired for the effort to release the foot by a twisting movement to be smaller than that required for releasing the foot by a backward movement.

SUMMARY OF THE INVENTION

In accordance with the invention, a fixing device of the type defined above is characterised in that the frontal stop means and the catch of the plate extend transversely beneath the sole of the shoe, at the rear of the widest sole portion whilst the frontal stop means associated with those of the plate and mounted on the pedal extend transversely over the major part of the width of the pedal and are fixed on the pedal at the rear of the geometrical axis of rotation of the pedal.

Thus, according to the invention, the centre of rotation of the shoe in relation to the pedal is located in a bearing zone of the frontal stop means of the plate and of the pedal, that is to say, to the rear of the pedal axis. This centre of rotation is located substantially under the sole of the foot which constitutes the preferential zone for transmitting forces exerted by the foot. The twisting movement can thus be easily executed, according to the invention, because of the backward position of the centre of rotation.

Moreover, if a toe strap is used and mounted at the rear of the pedal, then in accordance with the invention the centre of rotation of the shoe lies substantially at the level of the toe strap so that there is substantially no transverse movement of the shoe in the region of this strap to constitute any obstacle to this twisting movement.

Moreover, because the frontal stop means and the catch of the plate extend transversely under the shoe sole whilst the frontal stop means provided on the pedal also extend transversely, the user can engage the fixing device relatively easily without being obliged to engage a pin in a slot or similar before producing such an engagement.

Advantageously, the holding device extends transversely over the major part of the width of the pedal rear part, and is movably mounted so as to be capable of moving back and/or taking up a slanting position, in particular by turning towards the back and/or transversely, on one side or the other.

The longitudinal distance between the frontal stop means of the pedal and the holding element is reduced in relation to the longitudinal dimension of the pedal.

The elastic biasing means comprise two elastic elements each of which acts on one of the lateral ends of the holding element so that, during a transverse turning of the shoe in relation to the pedal, the catch which bears with one of its lateral front ends against the associated frontal stop means turns transversely by pushing the holding device essentially against one single elastic element, whilst during a rearward tug of the shoe the holding element is displaced against the two elastic elements.

Thus the torsional releasing movement, which is effected practically against a single elastic element, is facilitated in relation to the rearward tugging releasing movement which must be effected against the two elastic elements.

The arrangement of the restraining means for restraining the plate in the upward direction, may comprise a hook section extending transversely, combined with a lip or similar provided on the plate.

The holding element can be constituted by a transverse strip; parallel to the axis of rotation of the pedal, with its two lateral ends folded back towards the rear portion and lower portion of the pedals and each coupled to one of the elastic elements which each comprise a restoring spring mounted on a support fixed to the rear and lower portion of the pedal.

The rearward facing transverse bearing surface of the plate can have, in its upper portion next to the shoe, a surface which is situated in a substantially vertical plane when the shoe is fixed on the horizontal pedal, against which surface the holding element bears to ensure the cooperation of the hook section and of the lip whilst in its lower portion, the said transverse bearing surface having a forwardly and downwardly inclined cam surface.

The springs biasing the holding element can be constituted by two torsion coil springs mounted side by side around the same transverse pin parallel to the axis of rotation of the pedal.

The two coil springs can be formed by windings in opposite directions of the extensions of the folded back lateral ends of the transverse strip of metallic wire. The internal ends of the two springs can be retained under the rear and lower portion of the pedal.

The lower surface of the lip can be downwardly and rearwardly inclined and constitutes a cam surface guiding the displacement of the catch downwardly and rearwardly by sliding on the upper rear part of the hook section under the effect of a substantially downwardly directed face. The upper surface of the lip can be substantially flat and perpendicular to the bottom of the groove.

According to an advantageous embodiment, when the shoe occupies its central angular position, the frontal stop means of the plate and the associated stop means of the pedal bear on each other along a contact zone of a width smaller than that of the frontal stop means alone of the plate, and the above mentioned stop means of the plate and of the pedal have portions which, at least on one side of the contact zone, diverge from each other longitudinally along a direction transversely of the bicycle on which the pedal is mounted.

The above mentioned stop means of the plate and of the pedal diverge longitudinally from each other along a transverse direction to either side of the contact zone, when the shoe is in its central angular position.

The contact zone between the stop means of the plate and those of the pedal is, for the central position of the shoe, preferably substantially pointed.

When the shoe occupies its central angular position, this contact zone can be substantially at the centre of the width of the plate, or displaced inwardly or outwardly in relation to this centre to render "unshoeing" more difficult in a given twisting direction.

The above mentioned stop means is advantageously formed by the combination of a transverse flat surface provided on one of the components formed by the pedal and the plate, and a transverse cam surface having one apex and at least one ramp extending laterally rearwardly in relation to the apex, this cam surface being provided on the other component.

The cam surface may comprise two ramps extending rearwardly in relation to the apex, on either side.

Preferably, the transverse flat surface is provided on the pedal while the cam surface is provided on the plate, the apex being directed forwardly and the ramps extending laterally rearwardly in relation to the apex.

The fixing device advantageously comprises a toe-strap, or similar, retained on the pedal behind the axis of rotation of the pedal, and situated substantially at the level of the frontal stop means of the pedal.

A toe clip can be arranged at the front of the pedal, in which case the toe strap passes in the conventional way into an eyelet provided in the rear of the toe clip.

According to another possibility, the pedal is fitted at its front end with a flange which can form an angle of approximately 60° with the centre plane of the pedal, this flange being intended to serve as a frontal stop for the shoe. In this case, the strap of the toe clip is not held in position above the foot by means of an eyelet but this strap is made of a semi-rigid material.

In the case where a toe clip is provided, the front end of this toe clip preferably has the shape of a rounded shell which does not interfere with the turning of the shoe in relation to the pedal.

The invention also relates to a shoe characterised in that its sole is fitted with a plate for a fixing device as defined above.

The invention also concerns the pedal of a bicycle or similar machine comprising restraining means fitted with associated frontal stop means, with a holding element, and elastic restoring means for a fixing device such as defined above.

Other objects and advantages of the present invention will become apparent from a reading of the following description, given merely by way of example, of several particular embodiments described in detail with reference to the attached drawings, but which are in no way restrictive. In the drawing:

FIGS. 3 to 5 are longitudinal cross sectional views of the pedal of FIG. 1 and of a shoe fitted with the plate of FIG. 2, in the fixing position, at the commencement of release by pulling the shoe rearwardly and at the end of such release;

Figure 1:
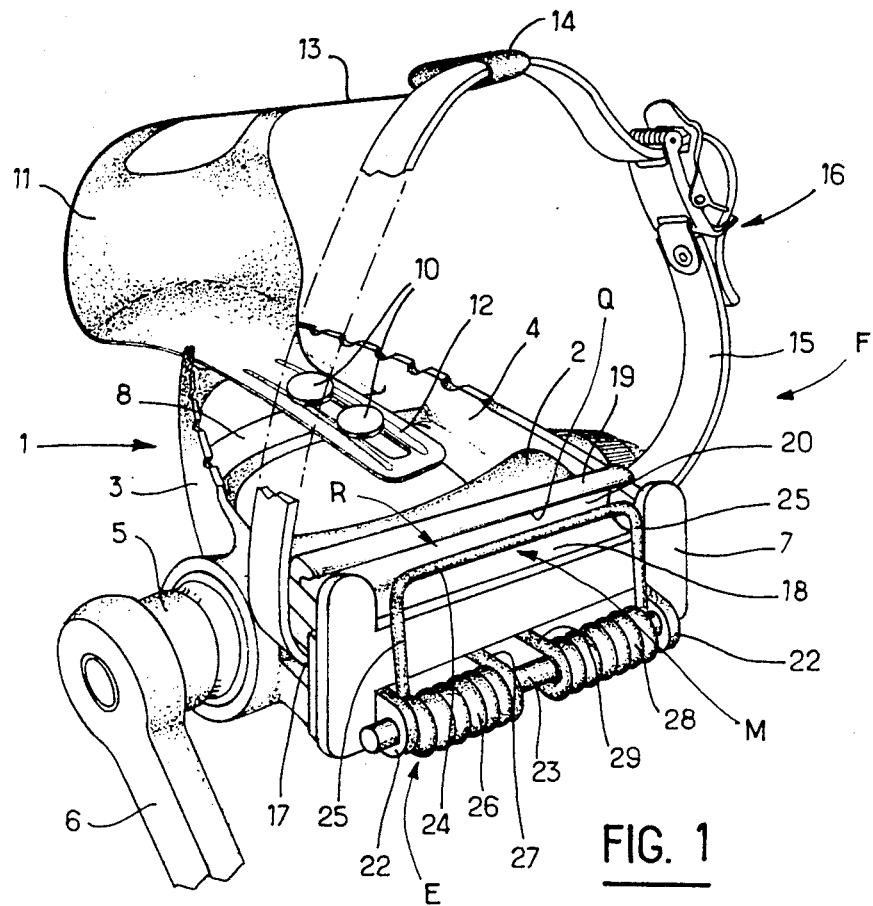
FIG. 1 is a perspective view of the left hand rear of a right hand bicycle pedal for use with a fixing device in accordance with the invention.
Figure 2:
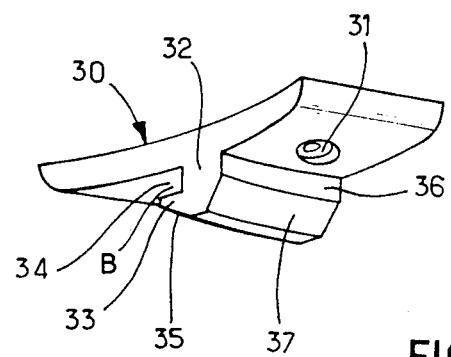
FIG. 2 is a perspective view viewed slightly from below and from the left hand rear, of a plate of a fixing device according to the invention, intended to be fixed under the sole of a shoe to cooperate with the pedal of FIG. 1.

Referring to the drawings and to FIGS. 1 to 8 in particular, a fixing device F may be seen for a shoe S on bicycle pedal 1.

Pedal 1, viewed in plan, has substantially the shape of a pointed portion of a shoe. It is freely mounted for rotation around a rotation spindle 5 cantilevered at the end of a crank 6, by means of ballbearings (not shown) accommodated in the ends of barrel 2 projecting outside the lateral pedal frame plates 3 and 4. The frame plates 3 and 4 are joined to each other via a small, flat transverse rear bar 7 as well as by a front bar 8.

The fixing device F for the shoe comprises a plate 30 fixed to the shoe sole, being in particular screwed on to this sole. Plate 30 comprises a forward stop means B towards the front and a rearward catch 32, that is to say a catch capable of opposing the rearward displacement of the stop.

The terms "front" and "back" should be considered with reference to the bicycle fitted with a pedal; similarly, the term "longitudinal" corresponds to the longitudinal direction of the bicycle whilst the term "transverse" corresponds to the crosswise direction, generally orthogonal, to the centre plane of the bicycle.

Restraining means R are mounted on pedal 1 and comprise frontal stop means Q associated with those B of plate 30 to restrain the latter towards the front; the restraining means R are, moreover, capable of restraining plate 30 in an upward direction.

In the particular embodiment represented in the drawings, plate 30 has the shape of a substantially rectangular plate curved to adapt to the sole portion of the cyclist's shoe; the means of B and Q are situated at the rear of the zone of the sole having the greatest width and at the rear of the geometrical axis A of pin 5. Catch 32 is a transverse catch projecting below the bottom surface of the plate and extending over the whole width of plate 30. The lower end is shaped as a forwardly directed lip 33, which delimits a transverse groove 34 whose bottom constitutes the above mentioned forward stop means B. The lower front side 35 of the lip is sloping rearwardly and forwardly. The rear side of the catch 32 has a rearward facing flat transverse surface 36 and a forwardly and rearwardly sloping lower surface 37.

The restraining means R mounted on the pedal comprise a base 18 extending transversely from one of the frame plates 3, 4 to the other, between the portions of the frame plates situated at the back of pedal barrel 2. Base 18 has, projecting upwards, a rearward facing hook section 19 extending transversely over the whole width of the pedal. An engagement channel 20 opening towards the rear is delimited between hook section 19 and base 18.

The rear bar 7 is flat and transverse whilst the front bar 8 is punched into two transverse sections set off from front to rear; these sections are joined to each other via a central and longitudinal web whereon there is fixed, by two bolt-nut assemblies 10, a tab 12 constituting the lower, rearwardly bent end of a toe clip 11. The front end of toe clip 11 has the shape of a forwardly domed shell whose upper portion is extended towards the back via an upper tab 13. The rear end of this tab 13 forms a grummet or loop 14 to receive the toe strap 15 provided with tightening mechanism 16 which joins the two straps ends. Strap 15 passes through two openings 17 provided in the frame plates 3 and 4, behind the pedal barrel 2 and under a general parallelpipedonal base 18 which is fixed by screws (not shown) with the rear bar 7.

Hook section 19 projects above the bearing plane delimited on pedal 1 by the upper edges of frame plates 3 and 4.

The lower surface of hook section 19 or the upper side of channel 20, is parallel to the opposite surface of base 18 or lower wall of channel 20 and is perpendicular to the flat bottom of channel 20. The rear and upper end of hook section 19 is rounded and a longitudinal and central cut out is arranged in the lower side of the base 18. The rear bar 7 carries two rearwardly projecting lateral tabs 22 perpendicular to the spindle 5 wherein there is mounted a transverse pin 23 parallel with the spindle 5; a bow made of metal wire is articulated on this pin 23. This bow forms a holding element M intended to be applied by elastic restoring means E against the back (surface 36) of the catch 32 of the plate.

This bow is constituted by a metallic wire whose central portion forms a transverse strip 24 parallel to the spindle 5 and is intended at its two lateral ends in sections 25 bent at a right angle, of which the one on the left (FIGS. 1 and 6 to 8) is in turn extended by a leftwardly wound portion around the left hand half of the pin 23 in a torsion spring 26 whose rectilinear end 27 is retained in cut out 21 of the lower side of base 18 whilst the bent section 25 on the right is extended in a rightwardly wound portion around the right hand half of pin 23 in a torsion spring 28, whose end 29 is also held in cut out 21. The two torsion springs 26 and 28 are thus mounted side by side on pin 23 and elastically bias the strip 24 rotationally towards the front against the rear bar 7, the strip 24 then being located at a slightly higher level than that of the hook section 19.

The device whose various components have been described above, functions in the following way.

Figure 6:
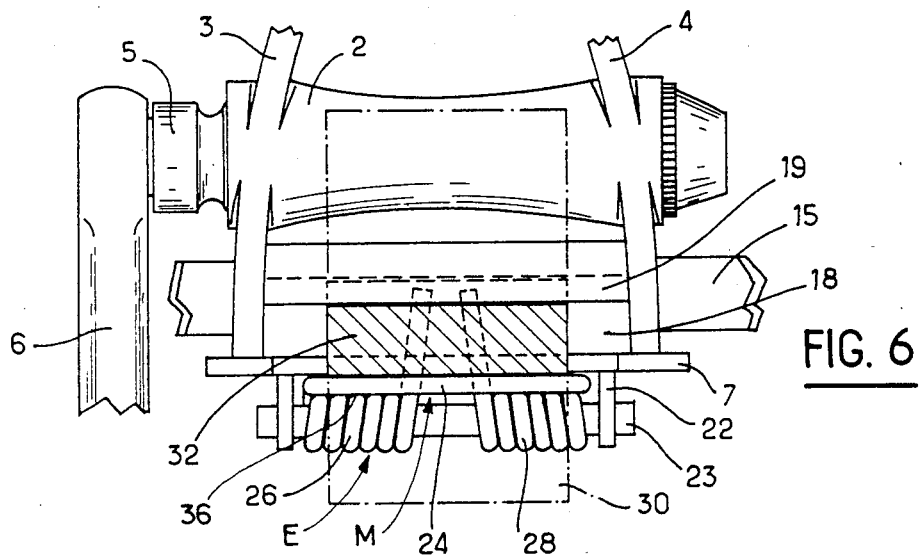
FIG. 6 is a cross-section along VI—VI of FIG. 3.

After the plate 30 has been fixed under the sole of a shoe S, when the cyclist wishes to fix the shoe on the pedal he engages the front of the shoe S in the toe clip 11 until it comes to abut with the point of the shoe against the shell-shaped front end of toe clip 11 which positions the front of the shoe S longitudinally and vertically so that the catch 32 of plate 30 should be right above the hook section 19 and the transverse strip 24 biased into the furthest forward position against the rear bar 7 by springs 26 and 28. The cyclist then exerts a substantially downwardly directed push in order to apply the shoe S on pedal 1; the cam surfaces 35 and 37 of the catch 32 come respectively into contact with the upper rear edge of hook section 19 and with the strip 24. Cam surface 35 slides over the upper rear edge of the hook section 19 entailing a downward and rearward displacement of the catch 32 in relation to the hook section 19. Simultaneously the strip 24 slides against the cam surface 37, and then against bearing surface 36 whilst being pushed rearwardly against the springs 26 and 28 until the front end of the lip 33 has passed beyond the rear edge of the hook section 19. Springs 26 and 28 then re-strain the strip forwardly which, by bearing against surface 36, pushes the catch 32 and hence the shoe S forwardly to engage the lip 33 in the engagement groove 20 until the rear end of the hook section 19, which is engaged simultaneously in groove 34, abuts the bottom of this groove 34. This forward movement of the shoe S, which brings it into the fixed position represented in FIGS. 3 and 6, is effected over a travel which is shorter than the initial rearward travel of the shoe so that in the fixed position, the front of the shoe no longer bears against the front of toe clip 11. In the fixed position, the hook section 19 constitutes a stop restraining upward and forward movement of the shoe F and the transverse strip 24 constitutes a movable element for holding and elastically restraining the catch 32 in a position where its lip 33 cooperates with the hook section 19. The upper side of the lip 33 and the lower side of the hook section 19 are parallel and in contact with each other and, when the pedal 1 is substantially horizontal, these two sides are horizontal whilst the bearing surface 36 at the rear of catch 32 is vertical.

From this position the shoe S can be released by tugging rearwardly, or both upwardly and rearwardly when the horizontal component of this pull exceeds a threshold corresponding to the elastic biasing value of the two springs 26 and 28 for, by means of such a pull, the catch 32 pushes the strip 24 rearwardly against the two springs 26 and 28. As shown in FIG. 4, after a backward movement of the shoe S over a travel slightly exceeding the depth of groove 34, the shoe S can be released by an upward and rearward displacement, if no toe strap is mounted on toe clip 11. On the other hand, if a toe strap 15 is used, the release of the shoe S occurs only after a backward movement over a longer travel and such that transverse strip 24 should be pushed back further, to the point where it slides over the cam surface 37, as represented in FIG. 5.

Figure 7:
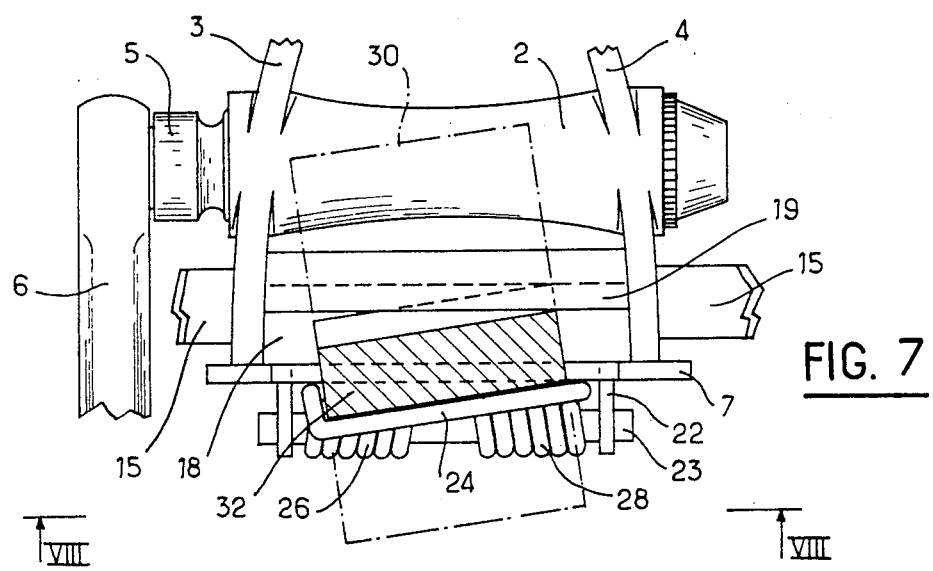
FIG. 7 is a cross-section similar to that of FIG. 6, in the position where the shoe is released by transverse twisting.
Figure 8:
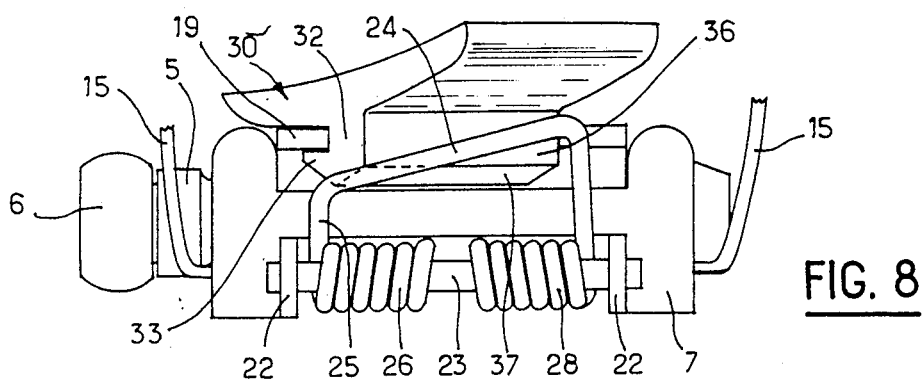
FIG. 8 is a rear elevation, viewed along line VIII—VIII of FIG. 7.

It is also possible to release the shoe S by transverse twisting, by exerting at the heel a lateral force for instance, outwardly directed, that is to say towards the right for the right foot. As represented in FIG. 7, the catch 32 is turned by bearing with its front right hand lateral end on the hook section 19; the left hand lateral rear end of catch 32 pushes the left hand lateral end of the strip 24 rearwardly against the single left hand spring 26. In its rearward movement the strip 24 is being lowered rearwardly, turning laterally towards the right so that very quickly the strip 24 slides over the cam surface 37 as represented in FIG. 8 to facilitate rearward release of shoe S. The rearward lowering of the strip 24 by turning around the pin 23 in the region of the single spring 26 and laterally because of the lateral turning of catch 32 as well as the sliding of the strip 24 over the cam surface 37, are obtained by exerting a very small transverse force at the heel because this twisting movement is exerted against a single spring and because there is a large lever arm corresponding to the distance (approximately 140 mm) separating the heel from the catch 32 in relation to the transverse dimension (approximately 40 mm) of the catch 32 so that the ratio of the lateral force on the heel to the reaction force exerted by the catch 32 on the strip 24 is equal to the relatively small ratio between these two dimensions. Thus the lateral force on the heel is equal to the product of the reaction force necessary for the displacement of strip 24 against one single spring and of a coefficient which is far below 1. For these two reasons, the releasing threshold by transverse torsion is much lower than the releasing threshold by a rearward pull. Since the centre of rotation of the shoe S in the case of transverse torsion is substantially at the centre of the catch 32 behind the pedal spindle 5, and in the buckle formed by the top strap 15, this strap does not constitute any obstacle to the twisting movement because it is not stretched laterally. To release the shoe S completely after the fixing device has been disengaged by transverse torsion, it suffices to disengage the shoe by movement rearwardly.

It is also possible to release the shoe S by effecting a rearward pulling movement combined with a small transverse torsion since the cooperation between the catch 32, the hook section 19, the strip 24 and the springs 26 and 28 in order to allow the release, is the same as that described above.

This device thus allows the shoe S to be released with very different force thresholds, in relation to the different releasing directions envisaged. Tests undertaken by the applicant have shown that if the force measured on a dynamometer, necessary on disengaging the device for releasing the shoe by rearward traction is 160 N, which allows a voluntary release by the cyclist as well as a release in the case of a fall, a lateral force at the heel of 40 N suffices to release the shoe by transverse torsion, while a force of 80 N is necessary in case of a combined movement of rearward traction and of torsion, to draw the heel rearwardly and slightly in an oblique direction.

It will also be noted that the shell-shaped form of the front of toe clip 11 does not interfere with the rotations of shoe S in cases of release by way of torsion.

In order to simplify manufacture of the device, plate 30 and catch 32 on the one hand, and the hook section 19 and its base 18 on the other hand, can be made from a single piece by moulding of a rigid synthetic material.

In variants of the embodiment, springs 26 and 28 can be made differently and may for instance be mounted longitudinally under the pedal 1.

Although the possibility of separating the foot from the shoe by a twisting movement is advantageous, in particular in the case of a fall, it has the inconvenience of sometimes leading to untimely disengagements or "unshoeings" of the shoe in relation to the pedal. This can, for instance, be the case when a cyclist is riding on a bad road or on cobbles leading to tremors and movements, in particular, involuntary torsional uncontrolled foot movements. These movements can also occur during starting or standing on the pedals, for instance on a hill. Such torsional movements can lead to untimely "unshoeing"; (the term "unshoeing" must be understood as designating the opening of the fixing device which releases the pedal in relation to the shoe).

Moreover, it can happen that a user wishes to adopt an angular foot position on the pedal slightly different from that imposed by the fixing device, for instance for some relaxation after a certain period of pedalling, or even to find an angular position which is the most convenient one. In fact, sports physicians have indicated that a badly placed toe clip or even a toe clip imposing a fixed position may cause persistent pain at the knee and at the head of the fibula.

Of course, it must be possible to effect this slight modification of the foot position without having to exert a substantial force in addition to the cycling exertion. In practice, the devices known to date do not allow such modifications of the foot position to be made without a substantial risk of "unshoeing" or of increased fatigue.

The object of the variant embodiment shown in FIGS. 9 to 12 is, above all, to provide a fixing device which would allow the user to adopt a slightly different angular foot position from that initially foreseen, without leading to untimely "unshoeing" due to uncontrolled torsional movements.

Such a fixing device is characterised in that when the shoe occupies its central angular position, the frontal stop means of the plate and the associated stop means of the pedal bear on each other along a contact zone of shorter width than that of the plate frontal stop means itself, and the above mentioned stop means of the plate and of the pedal have portions which diverge longitudinally from each other in a direction transversely away from the contact zone on one side at least.

Thus, during a twisting movement of the shoe in a direction which tends to bring together the portions of the stop means separated from each other in the central position of the shoe, the contact zone of the stop means is going to be displaced transversely towards one edge of the plate. At the start of the twisting movement, the holding device will be slightly displaced and the risk of untimely "unshoeing" is diminished; moreover, the start of such a twisting movement of the shoe does not require any important exertion on the user's part. If the twisting movement continues, tne displacement of the contact zone of the stop means entails a stronger stressing of the holding element which requires a stronger exertion on the user's part until the "unshoeing" is obtained.

Figure 9:
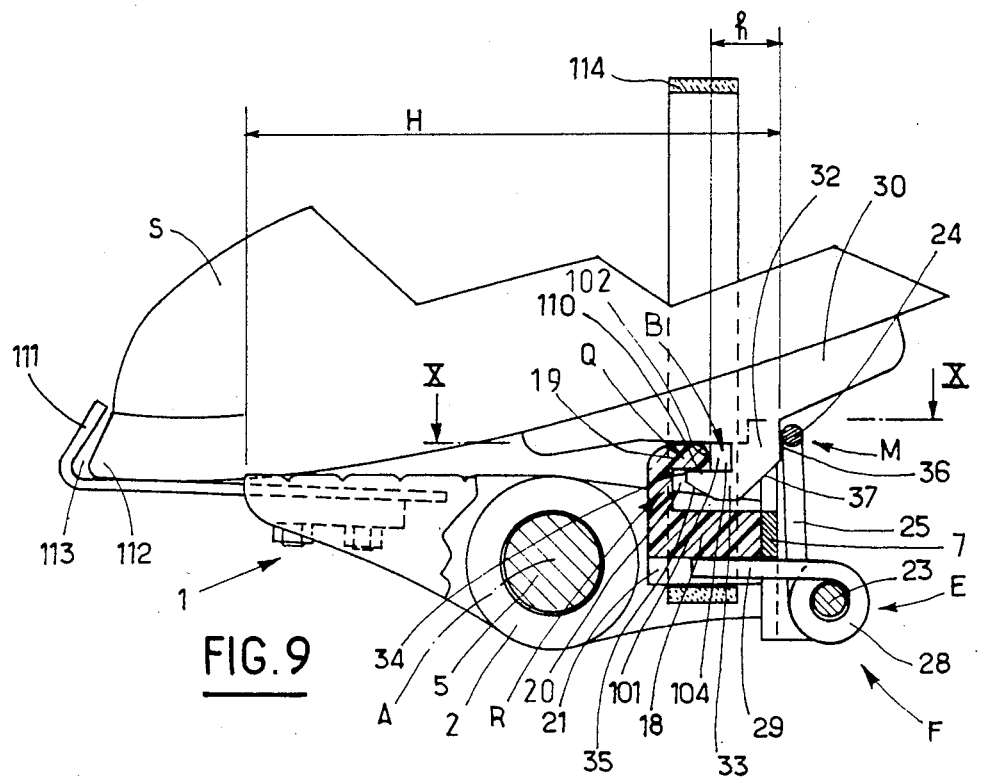
FIG. 9 is a side view with cut off portions of a pedal fitted with a different embodiment of a fixing device according to the invention.
Figure 10:
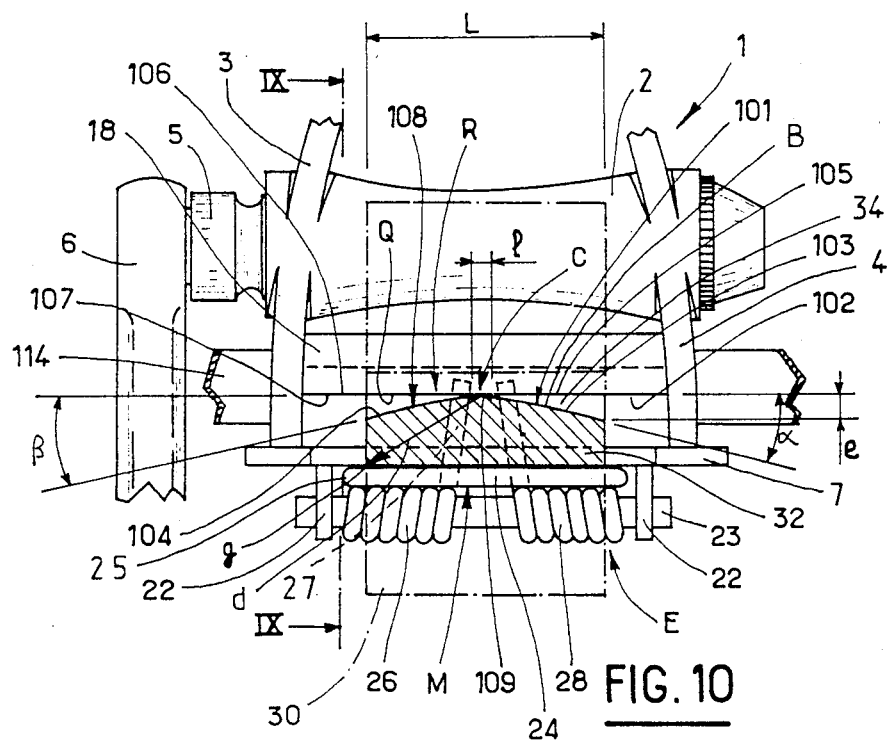
FIG. 10 is a cross-section along line X—X of FIG. 9, with portions removed, the shoe being supposed to occupy its central angular position.

As can be seen in FIGS. 9 and 10, the bottom of groove 34 is designated by 101 and constitutes the frontal stop means B.

The transverse edge 102 of hook section 19 constitutes the frontal stop means Q associated with the stop means B of plate 30. The horizontal position of the hook section 19 is intended to cooperate with the horizontal portion of the lip 33 to restrain the plate 30 in the upward direction in relation to pedal 1.

The holding element M, movably mounted on the pedal, is provided in order to be applied by elastic biasing means E against the rear (surface 36) of catch 32 of the plate. The means M are capable of opposing a rearward displacement of the said plate 30 when the rearwardly exerted force on the shoe S in relation to the pedal 1 remains below a predetermined threshold; when this threshold is reached or exceeded, the holding element M is retracted and permits the displacement in question.

This holding element M can be constituted by a transverse strip 24, parallel to the pedal spindle 5, already described with reference to FIGS. 1 and 3 to 5.

Figure 11:
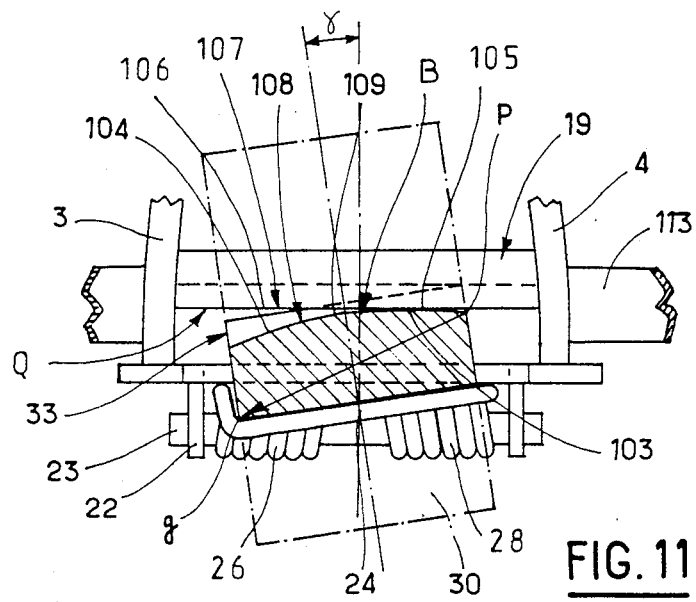
FIG. 11 is a cross-section similar to that of FIG. 10 for a different angular position of the shoe.
Figure 12:
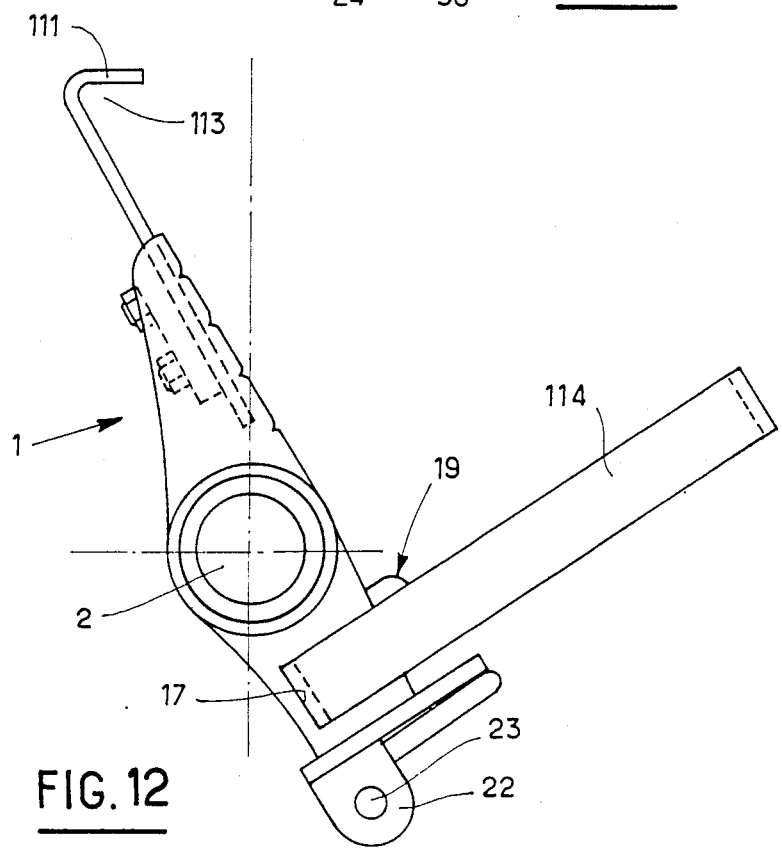
FIG. 12 is a schematic outline illustrating the rest position of the pedal.

This holding element M (strip 24) is thus mounted on the pedal so as to be capable of displacement towards the rear, whilst remaining substantially parallel to itself, or may be capable of rearward movement either at one end, as illustrated in FIG. 11, or at the other, strip 24 then forming an angle with the transverse direction.

Thus, during turning of the shoe S, the holding element M, in the present case spring strip 24, essentially turns against a single elastic element 26 or 28, whilst during rearward traction on the shoe S, the holding element M, or strip 24, is displaced against the two elastic elements 26, 28 which exert a higher resistance than with the turning movement.

When shoe S occupies its central angular position (FIG. 10), the frontal stop means B of plate 30 and the associated stop means Q of the pedal 1 bear on each other along a contact zone C of width 1 which is smaller than width L of the frontal stop means B of plate 30; the above mentioned stop means B and Q have respective portions 103, 104 for B and 105, 106 for Q which, at least on one side of the contact zone C, diverge longitudinally from each other along a direction transversely of the bicycle.

Preferably, the stop means B and Q diverge longitudinally from each other on both sides of the contact zone C. As may be seen in FIG. 10, the longitudinal separation between means B and Q is zero at the contact zone C. This longitudinal separation is equal to e at the outer end of the opposite portions 103, 105.

The stop means B extend over the whole width of the plate 30 whilst the stop means Q extend substantially over the whole width of pedal 1 which is wider than plate 30.

In the example represented in FIGS. 10 and 11, when the shoe S is in its central angular position, the contact zone C is situated substantially at the centre of the width of plate 30. However, in the central position of the shoe, this contact zone C could be displaced towards the inside or the outside of the pedal in relation to the centre of the width of plate 30 to render "unshoeing" more difficult in one torsional direction than in the other.

The elastic biasing means 26, 28 are arranged in such a way that the resultant of the biasing forces exerted on the plate 30 by way of the holding element M, passes through the contact zone C, or in the vicinity of this zone, when the shoe is in the central angular position. Shoe S is therefore not pulled into rotation by these elastic means E and the user does not have to exert any force to maintain shoe S in this central position.

The stop means B, Q is formed by the combination of a transverse flat surface 107 with a transverse cam surface 108 which has an apex 109 and two ramps formed by the portions 103, 104 referred to above.

In the embodiment represented in FIGS. 9 and 10, the cam surface 108 is provided on the plate 30 whilst the flat transverse surface is provided on the pedal 1. It is clear that the cam surface could be provided on the pedal and the flat transverse surface on the plate.

The apex 109 is forwardly directed and the ramps 103, 104 extend laterally rearwardly in relation to the apex 109. The transverse flat surface 107 is orthogonal to the longitudinal direction of the bicycle. In its central position, the contact zone corresponds to the bearing zone of apex 109 on surface 107.

Surfaces 103, 104 can be either flat or curved, as shown in FIGS. 10 and 11 where the surfaces 103, 104 are slightly convex. The median directions of the surfaces 103, 104 form angles $\alpha, \beta$, respectively, with the transverse direction. In the example considered, these two angles are equal and the cam surface 108 is symmetrical in relation to the longitudinal axis passing through the tip or apex 109. This cam surface has the shape of an open V whose point is directed forwardly.

By causing the slope of the V, that is to say, the angles of inclination $\alpha, \beta$ of the arms of the V in relation to the transverse direction, to vary it is possible to vary the "unshoeing" angle as explained in greater detail below.

The contact zone C between apex 109 and the transverse surface 107 is substantially pointed. The transverse surface 107 is formed by the combination of two portions 105, 106 which are coplanar with the associated stop means Q.

The horizontal portion of lip 33 of the plate constitutes a flange 110 projecting forwardly below the frontal stop means B of the plate, this flange 110 being capable of cooperating with the complementary flange of the hook section 19 to prevent upward disengagement of the plate. The longitudinal distance h (FIG. 9) between the stop means B and the rear side 36 of the catch 32 is small in relation to the longitudinal dimension H of the pedal, the h/H ratio being preferably less than or equal to ¼ (or 0.25). The restraining means R, and hence the frontal stop means B and Q, as well as the holding element M are located at the rear of the pedal spindle 5.

The pedal can be fitted at its front end with a flange 111 directed upwardly in relation to the centre plane of the pedal and forming an angle of approximately 60° with this plane. This flange 111 is intended to serve as a frontal stop, the shoe sole being capable of comprising a point 112 at the front, intended to engage in the space 113 (FIG. 9) delimited by the reduced size flange 111.

The pedal 1 is advantageously balanced in such a way that in the free state when its spindle 5 is horizontal, it takes up a median position (see FIG. 12) wherein the said flange 111 is substantially horizontal in a raised position. The cyclist can thus easily find the space 113 when engaging his foot on the pedal.

The flange 111 constitutes a kind of toe clip. The pedal 1 may be fitted at the rear with a semi-rigid strap 114, simply held in relation to the pedal on its two lower lateral edges, by openings 17 provided in frame plates 3, 4.

It should be noted that the toe strap 114 is not held on the top of the shoe by the grummet usually provided at the rear end of the tab of a conventional toe-hold.

This being so, the functioning and use of a fixing device according to the invention are as follows.

To place a foot in position on the corresponding pedal, the cyclist equipped with shoes provided with the appropriate sole plates 30, engages the point 112 of the sole toe in the space 113 against the flange 111. This engagement is facilitated by the position of the pedal in the free state, represented in FIG. 12. A slight push exerted on the flange 111 allows the pedal 1 to be brought substantially into the horizontal position.

The inclined surface 35 of the lip 33 comes to bear against the upper edge of the hook section 19 whilst the inclined surface 37 bears against the strip 24.

By exerting a vertically downward push on the sole plate 30, the cyclist produces the backward movement of strip 24 and descent of the catch 32.

The elastic means 24 then push the catch 32 forward, and the hook section 19 enters into the groove 34. Apex 109 comes to bear against the frontal surface 107 in the contact zone C situated substantially half way along the width of plate 30.

At the start of a twisting movement of a shoe, produced for instance at an undesirable time by tremors due to a bad road or cobbles, the turning of the shoe sole in relation to the pedal is effected around apex 109, that is to say around the contact zone C of the shoe when in the central position.

If it is, for instance, supposed that the plate 30 turns in relation to the pedal in a counterclockwise direction as viewed in FIGS. 10 and 11, the point g against strip 24 at the inside of the plate, i.e. at the side of the pedal nearer the crank 6, is going to push this strip 24 during turning around the apex 109. Point g will describe a circular arc with a relatively small radius d.

As a result the strip 24 is subjected to a weak force at the start of the torsion movement and does not offer any considerable resistance to the slight angular deflection on either side of the central position. Moreover, the lip 33 remains duly engaged under the hook section 19 so that the risk of untimely "unshoeing" is small at the beginning of the turning movement where the contact is effected between the apex 109 and the side 107.

If the turning movement of th shoe in relation to pedal 1 is pursued in an anticlockwise direction, the ramp 103 comes nearer the part 105 (see FIG. 11).

The contact zone between the cam surface 108 and surface 107 is displaced transversely towards the outside, i.e. away from the crank 6, in such a way that the radius of the trajectory of point g increases. As a result a more substantial action on and displacement of the strip 24 occurs.

As the torsion continues, the point P situated on the outer edge of plate 30 and corresponding to the end of the ramp 103 comes into contact with the surface 107. The inclination $\gamma$ of the plate 30 in relation to the median longitudinal direction can be of the order of 10°. Up to this angular position, the user did not have to exert any strong force because the strip 24 is only slightly displaced.

Upon exceeding this latter angular position plate 30 turns around point P while bearing against surface 107. The resistance force developed by the spring 28 becomes higher because, for the same elementary angular displacement of the shoe and the plate 30, the transverse strip sustains a much greater displacement because of the fact that the radius Pg is at its maximum. Voluntary "unshoeing" is then obtained, since the backward movement of strip 24 is sufficient to release the lip 33 from the hook section 19.

It will be understood that by varying the slopes of the ramps 103, 104, that is to say by varying angles $\alpha$ and $\beta$, the "unshoeing" angle can be varied, that is to say the angle through which the foot must turn in relation to the central position to release the shoe may vary.

The contact zone C in the central position can also be displaced towards the appropriate side to render the "unshoeing" towards the outside more difficult and easier towards the inside.

As may be seen from FIG. 11, for a given torsional angle the presence of the cam surface 108 with the two ramps 103, 104 leads to a larger cam surface engaged under a hook section 19 than would be the case if the ramps 103, 104 were to be replaced by one transverse flat surface cooperating with another transverse flat surface.

Thus the cyclist will be able to modify the angular position of the shoe on the pedal slightly, to find a comfortable position for his foot, without having to exert great force and without risking any "unshoeing". In fact, as long as the apex 109 is in contact with the transverse surface 107, the torsional opening resistance of the device is small, since the spring 26 or 28 is only lightly loaded.

It should, moreover, be noted that the width of the frontal stop means Q which is substantially equal to that of the pedal, is greater than the width L of sole plate 30. Thus the cyclist has scope for displacing his foot and his shoe laterally by some millimetres in relation to a central position by sliding the sole plate 30 along the surface 107. The pedalling efficiency in effect essentially depends on the longitudinal position of the foot on the pedal whilst the lateral or transverse position can vary.

It is clear that ramps 103, 104 can be formed by rectilinear portions, in which case the plate 30 turns around the contact zone C as long as the angular deflection under a small force remains below the predetermined limit $\gamma$. When this limit is reached, the whole ramp 103 or 104 comes to bear against surface 107. Point P, also bearing against surface 107, becomes the pivot point.

In FIG. 11, γ designates the angle between the longitudinal axis of the shoe in the median position and this same longitudinal axis when the shoe has turned sufficiently to arrive at the end of the angular deflection permitted without any great effort and without the risk of "unshoeing". This position is obtained when the point P, being located outside ramp 103, comes into contact with part 105. Since ramps 103, 104 are generally rectilinear and symmetrical in relation to the longitudinal axis, angle γ is then equal to angles α and β (FIG. 10).

Advantageously the angle γ, which corresponds in some way to the angular deflection permitted with a small effort on either side of the central position, is of the order of 10°.

Figure 13:
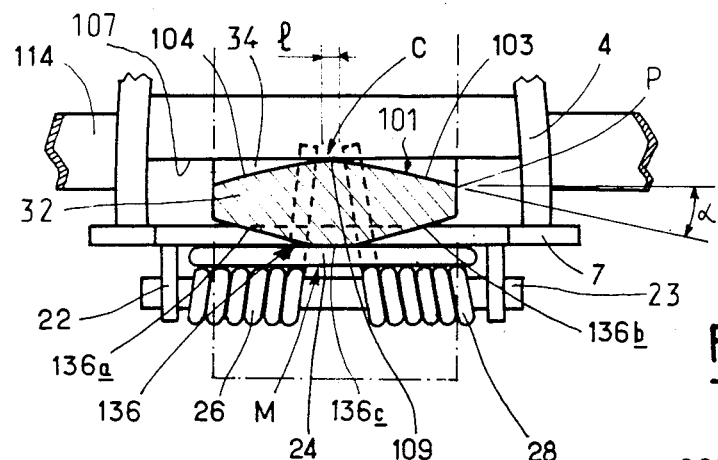
FIG. 13 is a cross-section similar to that of FIG. 10, illustrating a variant of the catch.

In order to reduce the effort to be developed by the user, in the orientation range corresponding to angle γ, provision may be made as shown in FIG. 13 for the catch 32 to have a rear surface 136 whose transverse cross-section through the plane of cross-section of FIG. 13 (which corresponds to the plane of cross-section of FIG. 10) has the shape of a V with its point directed rearwardly, that is to say, in a direction opposite to the point of the V formed by the bottom 101 of the groove 34.

The surface 136 thus comprises two lateral surfaces 136a, 136b, preferably flat and substantially vertical when the shoe is horizontal. These surfaces 136a, 136b can form an angle substantially equal to angles α and β with the transverse direction. Thus, 136a is substantially parallel to ramp 103, whilst surface 136b is substantially parallel to the ramp 104 on the opposite side. The two surfaces 136a, 136b are joined to each other by a central transverse surface 136c whose width can be equal to three times 1 and in particular, can be of the order of 15 mm to 20 mm. The surfaces 136a, 136b are preferably symmetrical with respect to each other in relation to the longitudinal axis.

When the shoe occupies its central angular position, the transverse strip 24 bears against portion 136c.

When the user slightly turns his foot, because of the presence of the inclined surfaces 136a, 136b the displacement of the transverse strip 24 is reduced and the torsional movement (whose amplitude is limited to a value of approximately 10°) is rendered easier.

Beyond this torsional limit value, point P (FIG. 11) comes into contact with the transverse surface 107 (FIG. 11) in such a way that it is necessary to exert a much stronger force to exceed this torsional angular limit to produce the "unshoeing".

In the case of the embodiment of FIG. 13, the inclined cam surface 37 (FIG. 9) extending surface 36 downwardly, also has a V shaped transverse cross-section with its point facing rearwardly so as to extend the surface 136.

Since the user can orientate his foot practically without exerting any torque in a determined angular range (approximately 10° more or less around a predetermined central position) it is in practice possible to dispense with any "transverse adjustment" of plate 30 and hence of catch 32 in relation to the shoe sole. By "transverse adjustment" of plate 30, there is intended an adjustment of the angular position of the median longitudinal direction of the catch 32 in relation to the median longitudinal direction of the shoe, generally obtained by means of tightening screws or similar, cooperating with oblong openings.

Figure 16:
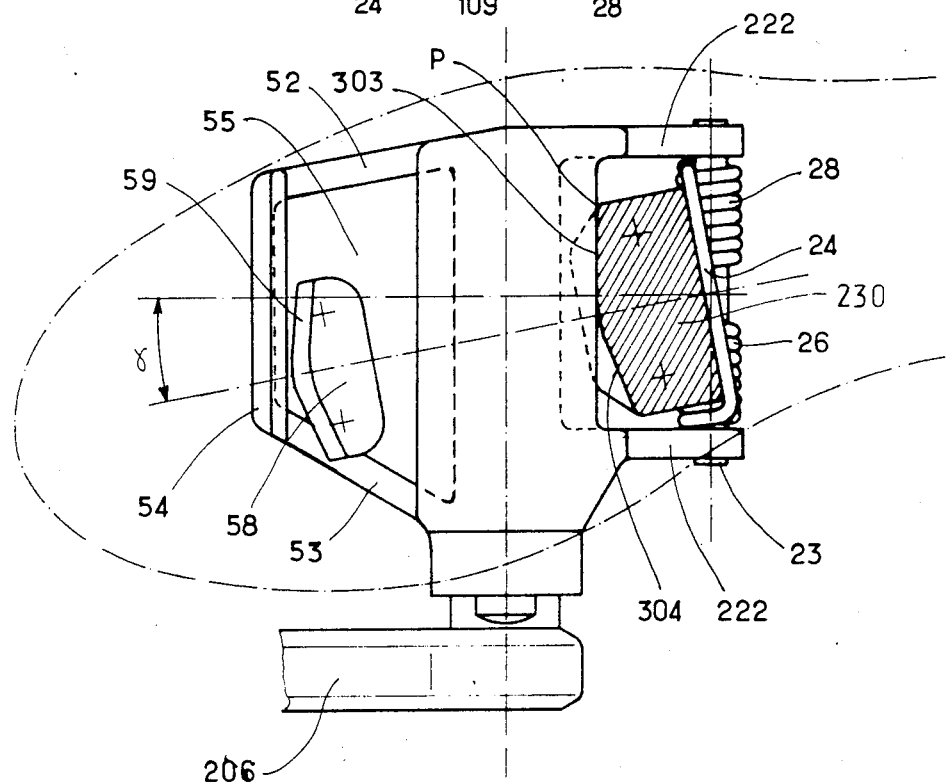
FIG. 16 is a view similar to FIG. 15 with parts in cross-section, the shoe being at an angle to its central position.
Figure 14:
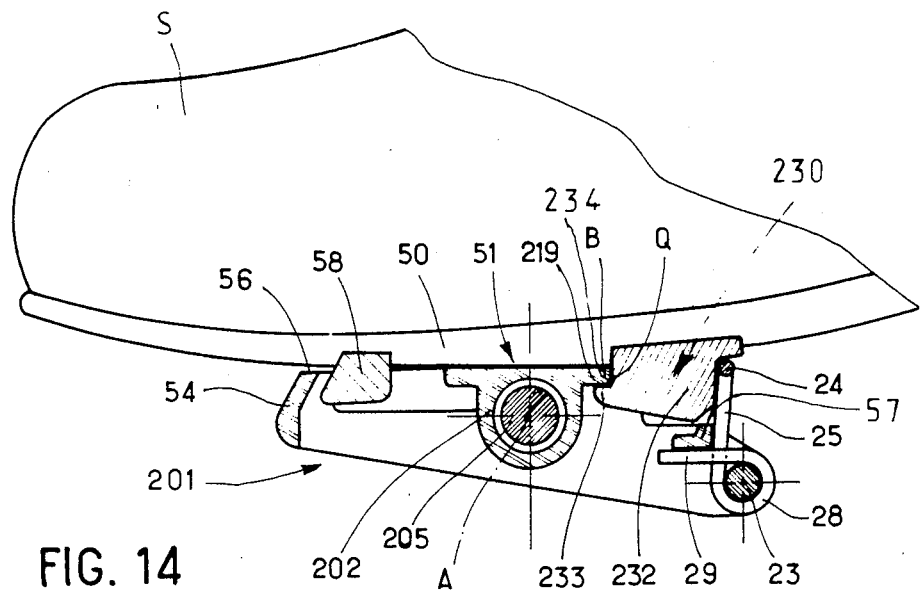
FIG. 14 is a longitudinal cross-sectional view of a variant of the pedal embodiment and of the fixing device.
Figure 15:
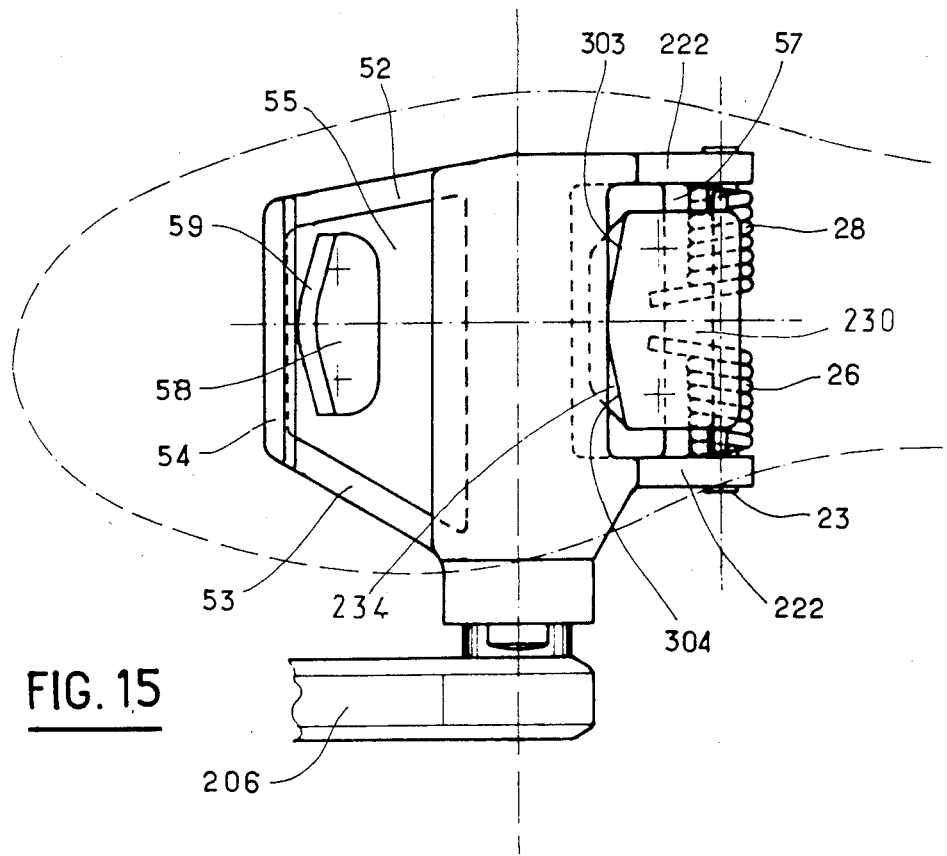
FIG. 15 is a top view in relation to FIG. 14, the shoe occupying its central position; and finally.

FIGS. 14 to 16 illustrate a variant of the embodiment of the fixing device according to the invention and of the associated pedal.

Those elements of the fixing device and of the pedal which perform similar functions to those performed by the elements already described with reference to the preceding Figures, will be designated either by the same reference number or by a reference number increased by 200. The description of these elements will be effected succinctly or simply not be repeated.

The sole of the shoe S has a substantially flat zone 50 at the portion intended to bear on the pedal, this zone being extended towards the front and towards the rear by sole zones which are downwardly convex.

Pedal 201 is of a monobloc design. It is composed of a barrel 202 having an upper horizontal surface formed by a plate 51 intended to serve as a support for the zone 50 of the shoe. This plate 51 extends forward and backward in relation to the sleeve constituting the barrel 202 proper. The rear edge of this plate 51 forms the hook section 219 and the frontal stop means Q of the pedal.

The front edge of plate 51 is integral at each of its ends with two forwardly projecting arms 52, 53 which are interconnected by a transverse ledge 54 and delimit an opening 55 whose trapezoidal shape is clearly visible in FIG. 15. Arm 52, situated furthest from the crank 206 is slightly inclined in relation to the longitudinal direction, whilst the arm 53 nearer the crank, is more strongly inclined in relation to the longitudinal direction so as to extend away from crank 206 in a direction towards the ledge 54.

When the plate 51 is horizontal and at the top, as represented in FIG. 14, the upper portion 56 of ledge 54 is substantially in the horizontal plane of this upper side of the plate 51.

The barrel 202 is extended at the rear by two longitudinal arms 222 comprising bearings for receiving the ends of pin 23. These arms 222 are interconnected at the rear by a cross-piece 57 intended in particular to serve as a stop for the ends 29 of spring 28 engaged around pin 23. In the embodiments of FIGS. 14 to 16 the parts 25 of the spring 28 preferably have such a length that the arm 24 is slightly above the upper plane of plate 51 as illustrated in FIG. 14.

The plate 230, fixed to the shoe sole, can be embedded in this sole as illustrated in FIG. 14. This plate 230 can be formed by a metallic component or may be made from a plastic material. There is a lip 233 in the lower zone of the front of plate 230. This lip 233 is intended to engage under the rear edge 219 of the pedal plate 51. The frontal stop means B of this sole plate 230 are similar to those of FIGS. 9 to 11, and comprise two rearwardly inclined ramps 303, 304 (FIG. 15) forming a V whose point faces forwards.

The transverse groove 234, whose bottom constitutes the above mentioned frontal stop means B, is limited towards the bottom by the lip 233 and towards the top by the lower surface of the shoe sole, and more particuarly by the lower surface of the flat zone 50.

Thus according to this embodiment, the shoe sole bears directly on the plate 51 at a short radial distance from the geometric axis of rotation A of the pedal.

The hold of the shoe on the pedal is ensured by the fixing device of FIGS. 14 and 15 with scope for an angular deflection, upon a small exertion, to either side of the longitudinal median position without producing any "unshoeing", as is the case in FIGS. 9 to 11.

FIG. 16 illustrates an extreme position of this angular deflection with little exertion; if the twisting movement of the foot proceeds beyond the position represented in FIG. 16, a stronger resistance is exerted by the spring 28 as explained above. A continuance of the twisting movement produces the "unshoeing".

According to the embodiment of FIGS. 14 to 16, the pedal 201 is no longer extended by an attached toe-clip as was the case in FIGS. 1 to 12. An additional catch 58 fixed beneath the shoe sole so as to be located in front of the pedal spindle 205 makes it possible, when the foot is on the pedal, to come to bear against the transverse edge 54. Subsequently, when the fixing device is engaged, and the plate 230 is tightly held between the edge 219 and the transverse strip 24 of the spring, the catch 58 is slightly behind the edge 54 as illustrated in FIG. 14.

This catch 58 does not thus act to restrain the shoe in the frontal direction during pedalling and serves solely to facilitate the positioning of the shoe at the time when the foot is being placed in position on the pedal. The front edge 59 of this catch has a forwardly facing V shape so as to allow rotation of the foot, as illustrated in FIG. 16, without this edge 59 interfering with the transverse edge 54 of the pedal.

The pedal in the embodiment of FIGS. 14 to 16 can be made of a light moulded alloy.

With every embodiment of the fixing device of the invention, rearward "unshoeing" is allowed by pushing strip 24 while it remains parallel to the spindle 5.

The cooperation of the lip 33, 233 and of the hook section 19, 219 ensures an effective restraining of the shoe in the upward direction during pedalling.

I claim:

1. Device for fixing a shoe on a pedal of a pedal-powered machine such as a bicycle, comprising in combination:
   (a) a sole plate to be fixed to the sole of a cyclist's shoe and having forwardly and rearwardly facing transverse bearing surfaces at the front and rear of the plate comprising frontal forward stop means and a rearward surface;
   (b) restraining means mounted on the pedal and comprising on one hand frontal stop means adapted to be associated with those of the sole plate for restraining the sole plate in the forward direction, and, on the other hand, a transversely extending hook section on the pedal combined with a lip provided on said sole plate for restraining said plate in the upward direction, said frontal forward stop means of said sole plate being engageable against the frontal stop means of the pedal when the shoe is attached to said pedal;
   (c) holding means movably mounted on the pedal;
   (d) resilient biasing means capable of urging said holding means against the back of said rearward surface of the sole plate for opposing rearward displacement of the said sole plate when the rearward force on the shoe remains below a predetermined threshold value and for allowing said displacement when said threshold is at least attained;
   said frontal forward stop means and said rearward surface of the sole plate extending transversely under the sole of the shoe when said sole plate is fixed to the shoe sole, behind the portion of the sole having the greatest width, and said frontal stop means and said hook section of the pedal associated with said frontal stop means of the sole plate extending transversely over the major part of the width of the pedal and being fixed on the pedal behind the geometric axis of rotation of the pedal, said pedal including a portion which extends in front of said frontal stop means of said pedal, on which said portion the shoe is supportable substantially thereabove.

2. A device according to claim 1, wherein said holding means extends transversely over the major part of the width of the pedal and including means movably mounting said holding means on the pedal to be capable of one of (i) movement backwards relative to the pedal and (ii) pivotting relative to the pedal, in particular by turning to one side or the other about a vertical axis of the pedal.

3. A device according to claim 1, wherein the longitudinal distance between the frontal stop means of the pedal and said holding means is small in relation to the dimension of the pedal measured longitudinally in relation to the bicycle to which the pedal is fitted.

4. A device according to claim 1, wherein the rearwardly facing transverse bearing surface of the sole plate has, in its upper portion next to the shoe, a surface situated in a substantially vertical plane when the shoe is fixed on the horizontal pedal, and wherein said holding means bears against said substantially vertical surface to ensure the cooperation of the hook section and of the lip, whereas in its lower portion said transverse bearing surface has a cam surface which is inclined forwardly and downwardly.

5. A device according to claim 1, in which the width of the frontal stop means of the pedal is greater than the width of sole plate, so that the cyclist has scope for displacing his foot and his shoe laterally.

6. The apparatus as claimed in claim 1 wherein said frontal stop means of the pedal comprise a plane surface extending substantially parallel to the axis of rotation of the pedal.

7. The apparatus as claimed in claim 1 wherein the distance between said frontal forward stop means of said sole plate and the rear surface of said frontal forward stop means is small with respective to the dimension of the pedal measured along the longitudinal axis of the pedal.

8. The apparatus as claimed in claim 1 wherein the relation between the longitudinal distance between the frontal forward stop means of the sole plate and the rear face of the sole plate to the longitudinal dimension of the pedal is lower by one quarter.

9. The apparatus as claimed in claim 1 wherein said frontal forward stop means of said plate comprises a transverse cam surface provided with an apex pointing forwardly and at least one ramp extending laterally rearwardly with respect to said apex.

10. A device according to claim 9, wherein said cam surface comprises two rearwardly extending ramps on either side of the apex.

11. A device according to claim 10, wherein the cam surface has the shape of an open V.

12. A device according to claim 11, wherein said catch has a rear surface whose transverse cross section has the shape of a V with a rearwardly facing point.

13. A pedal for a pedal-powered machine such as a bicycle for use with a device for fixing a shoe on the pedal as claimed in claim 1, comprising a barrel including an upper surface formed by a plate for supporting a portion of the shoe, said plate having a rear edge forming a hook and the frontal forward stop means of the pedal, said plate having a rear edge disposed behind the geometric axis of rotation of the pedal.

14. In a device for fixing a shoe on a pedal of a pedal powered machine such as a bicycle, said pedal having a spindle, and said device being of the type comprising:
- a sole plate to be fixed to the sole of the shoe and comprising forward stop means and a catch having a rearward surface;
- restraining means mounted on the pedal and comprising frontal stop means associated with the stop means and catch of the sole plate for restraining the sole plate against forward and upward movement relative to the pedal;
- holding means on the pedal;
- means mounting said holding means movably on the pedal;
- elastic biasing means biasing said holding means against the rear surface of the sole plate for opposing rearward displacement of said plate relative to the pedal when the rearward force exerted on the shoe remains below a predetermined threshold, and for allowing rearward displacement when at least said threshold is reached; the improvement wherein,
- said elastic biasing means comprises two torsion coil springs mounted side by side around a common transverse pin connected to the rear of the pedal and parallel to the pedal spindle, said holding means comprises a transverse strip parallel to the pedal spindle and having two lateral ends which are downardly folded and coupled respectively to said two torsion springs, said strip extending transversely over a major part of the width of the pedal and being engageable with a rearward surface of the sole plate, said torsion coil springs acting respectively on said lateral ends of the strip so that during transverse turning of the shoe in relation to the pedal, said catch of the sole plate, which bears against the associated frontal stop means of the pedal, turns transversely by urging the strip essentially against a single one of said torsion coil springs, and during rearward traction of the shoe, movement of the strip is resisted by both of said torsion coil springs.

15. A fixing device according to claim 14, wherein the two coil springs are formed by windings of opposite hand of the extensions of the lateral bent ends of the transverse strip, and wherein said strip is made of metal wire.

16. A fixing device according to claim 15, wherein said two coil springs have interal ends which are retained under the rear lower portion of said pedal.

* * * * *